(12) United States Patent
Mildner et al.

(10) Patent No.: US 8,342,596 B2
(45) Date of Patent: Jan. 1, 2013

(54) DEFORMATION ELEMENT, MOTOR VEHICLE FENDER BRACKET WITH DEFORMATION ELEMENT, AND METHOD FOR PRODUCING A DEFORMATION ELEMENT

(75) Inventors: Udo Mildner, Limburg (DE); Lothar Teske, Aschaffenburg (DE); Viet-Hung Nguyen, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/959,313

(22) Filed: Dec. 2, 2010

(65) Prior Publication Data
US 2011/0133512 A1   Jun. 9, 2011

(30) Foreign Application Priority Data
Dec. 3, 2009   (DE) .......................... 10 2009 056 923

(51) Int. Cl.
*B60R 19/26* (2006.01)
*B60R 19/28* (2006.01)
*B62D 21/15* (2006.01)
(52) U.S. Cl. .................................. 296/187.09
(58) Field of Classification Search ............... 293/135, 293/133, 155, 132; 296/187.09, 187.03, 296/187.11, 203.01, 203.02, 204, 205, 30; B60R 19/26, 19/28; B62D 21/15
See application file for complete search history.

(56) References Cited

U.S. PATENT DOCUMENTS

| | | | | |
|---|---|---|---|---|
| 3,782,769 A | | 1/1974 | Fader et al. | |
| 3,907,351 A | * | 9/1975 | Pozelt et al. | 293/134 |
| 3,959,574 A | * | 5/1976 | Seanor et al. | 492/56 |
| 4,097,080 A | * | 6/1978 | Petry | 293/134 |
| 4,397,072 A | * | 8/1983 | Otthofer, Jr. | 29/401.1 |
| 4,624,493 A | * | 11/1986 | Hillebrand et al. | 293/136 |
| 6,050,624 A | * | 4/2000 | Kim | 293/132 |
| 6,227,583 B1 | | 5/2001 | Eipper et al. | |
| 6,871,889 B2 | * | 3/2005 | Ericsson | 293/132 |
| 7,029,044 B2 | * | 4/2006 | Browne et al. | 293/137 |
| 7,192,067 B2 | * | 3/2007 | Hansen | 293/133 |

(Continued)

FOREIGN PATENT DOCUMENTS

CN   2918161 Y   7/2007

(Continued)

OTHER PUBLICATIONS

British Patent Office, British Search Report for British Application No. 1020341.2, Mar. 10, 2011.

(Continued)

*Primary Examiner* — Glenn Dayoan
*Assistant Examiner* — Sunsurraye Westbrook
(74) *Attorney, Agent, or Firm* — Ingrassia Fisher & Lorenz, P.C.

(57) ABSTRACT

A deformation element, a motor vehicle fender bracket with the deformation element, and a method for producing a deformation element are provided. The deformation element serves to receive external impulses introduced into the deformation element and includes, but is not limited to at least two sleeves that are displaceable relative to one another, and a spring-elastic pressure element that is supported in each case on the at least two sleeves that are displaceable relative to one another. In this case, it is provided that at least one of the sleeves has at least one embossing that forms a sliding surface for the other sleeve. The at least one embossing is preferably introduced by electromagnetic pulse forming.

21 Claims, 8 Drawing Sheets

U.S. PATENT DOCUMENTS

2003/0019698 A1     1/2003   Dohrmann et al.
2007/0126148 A1*   6/2007   Coyle et al. .................. 264/299

FOREIGN PATENT DOCUMENTS

| | | |
|---|---|---|
| DE | 3809208 A1 | 9/1989 |
| DE | 19928099 A1 | 1/2001 |
| DE | 10326783 A1 | 1/2005 |
| DE | 102004053172 A1 | 5/2006 |

OTHER PUBLICATIONS

German Patent Office, German Search Report for German Application No. 102009056923.5, Sep. 2, 2010.

* cited by examiner

Fig. 8B

DEFORMATION ELEMENT, MOTOR VEHICLE FENDER BRACKET WITH DEFORMATION ELEMENT, AND METHOD FOR PRODUCING A DEFORMATION ELEMENT

CROSS-REFERENCE TO RELATED APPLICATION

This application claims priority to German Patent Application No. 102009056923.5, filed Dec. 3, 2009, which is incorporated herein by reference in its entirety.

TECHNICAL FIELD

The technical field relates to a deformation element, a motor vehicle fender bracket with a deformation element, and a method for producing a deformation element. The deformation element serves to receive and possibly transfer external impulses introduced into the deformation element. The deformation element comprising at least two sleeves that are displaceable relative to one another, and a spring-elastic pressure element, which is supported in each case on the at least two sleeves that are displaceable relative to one another.

BACKGROUND

Deformation elements are known in the prior art. Modern motor vehicles have to fulfill a number of different demands. In particular, the fender devices of the motor vehicle should satisfy a number of requirements which are in some cases difficult to combine. The regulations for the protection of pedestrians that are becoming more stringent in some countries require, for example, that in the event of a front impact with a motor vehicle, pedestrians can no longer be pushed under the vehicle but that they must rather be lifted away over the motor vehicle. This serves as protection from running over and furthermore has the advantage that an appreciable fraction of the impact energy can be absorbed by a correspondingly softly configured front hood of the motor vehicle, whereby the impulse loading on the pedestrian can be reduced.

Furthermore, modern fenders should withstand an impact at low speed without damage to the fender system and without visible external traces. To this end, the fender must be able to store impact energy and then release it again. Finally, fender systems must be able to absorb high forces in the event of an impact of the motor vehicle and introduce them specifically into the load paths of the motor vehicle.

DE 103 26 783 A1 discloses a motor vehicle bumper for connection to a supporting structure of a motor vehicle body, in which a decoupling device is provided comprising a first and a second force element which can be displaced relative to one another in the direction of force and a locking device which locks the first and the second force transfer element relative to one another. Further provided is a pull-back device that is connected between the first and the second force transfer element in such a manner that after removing the locking between the first and the second force transfer element. The device actively brings about a relative movement between the two. The pull-back device is configured as a prestressed spring. A disadvantage is that the system uses a number of components that increases the assembly effort and the manufacturing costs of the bumper device described there.

It is at least one object to provide a deformation element, a motor vehicle fender bracket with a deformation element, and a method for producing a deformation element, which is able to combine the different requirements and which allows cost-effective manufacture of a fender bracket system. In addition, other objects, desirable features and characteristics will become apparent from the subsequent summary and detailed description, and the appended claims, taken in conjunction with the accompanying drawings and this background.

SUMMARY

A deformation element has at least two sleeves that are displaceable relative to one another, between which a spring-elastic pressure element is disposed. The spring-elastic pressure element is supported in each case on the at least two sleeves that are displaceable relative to one another. With the aid of the spring-elastic pressure element and the sleeves that are displaceable relative to one another, the deformation element can absorb external impulses acting on the deformation element. Under the action of such external impulses, the at least two sleeves that are displaceable relative to one another are displaced toward one another against the force of the spring-elastic pressure element, and the energy transmitted with the impulses is absorbed in the spring-elastic pressure element up to the maximum possible energy capable of being absorbed by the spring-elastic pressure element and is intermediately stored there. If the energy acting on the deformation element is less than the energy capable of being absorbed by the spring-elastic element, the spring-elastic pressure element can release the absorbed energy again by relaxation and the deformation element remains undamaged.

At least one of the sleeves has at least one embossing that forms a sliding surface for the other sleeve. In this way, the deformation element can be produced with an extremely small number of parts so that fewer production and assembly steps are used as compared to the case with known deformation elements and furthermore, the assembly can be carried out very simply. Complex assembly steps involving a complex fastening of a plurality of components to one another can be avoided with the deformation element according to the invention. In addition, the implementation effects a low-friction sliding of the at least two sleeves onto one another so that low break-loose forces exist and at low collision speeds, no damage should be expected to a fender fitted with a deformation element according to the invention.

According to another embodiment of the deformation element, it can be provided that the at least two sleeves which are displaceable relative to one another, are arranged to be at least partially overlapping. By this means it can be achieved that the transversal stiffness of the deformation element is high and any undefined deformation of the deformation element outside the axis of translation or compression can thereby be prevented.

According to a further embodiment, it can be provided that the at least one embossing is provided on the inner sleeve. In this way, easy assembly of the deformation element and a particularly low-friction sliding of the two sleeves onto one another can be accomplished.

According to a further embodiment, it can be provided that in the region of the at least one embossing, the inner sleeve has an extension which is smaller than or equal to the internal extension of the outer sleeve. This is used for low-play or free-from-play guidance of the outer sleeve on the inner sleeve.

According to a further embodiment, it can be provided that at least two embossings are provided that are spaced apart axially with respect to one another. In this way, canting of the two sleeves under a non-purely axial force can be avoided, and the ease of movement of the two sleeves is additionally increased.

According to a further embodiment, the at least one embossing has a height of approximately 0.5 mm to approximately 3 mm, preferably approximately 1 mm to approximately 2 mm. Thus, an optimal compromise is achieved between structural strength of the sleeves with the embossings, ease of assembly, and ease of movement of the deformation element.

According to a further embodiment, it can be provided that the external sleeve has an embossing that forms a translation stop with the at least one embossing of the inner sleeve. The two embossings form a defined stop which allows the overall length of the deformation element to be fixed very precisely. In the event of a gentler impact in which the deformation element can absorb all the impact energy, it can furthermore be ensured with the aid of the translation stop that the deformation element returns to the same position as prior to the impact.

According to a further embodiment, it can be provided that the at least one embossing is produced by electromagnetic pulse forming. Electromagnetic pulse forming allows precise forming of the sleeves without weakening the material in the formed region. The structural stiffness of the deformation element can thus be maintained.

According to a further embodiment, it can be provided that the sleeves comprise tubular elements, which have a circular, oval, rectangular, or square cross-section. Such tubes can easily be formed and easily mounted.

In a further embodiment, it can be provided that the deformation element has fastening elements provided for fastening to longitudinal members, preferably lower longitudinal members, of an engine bearer module and fastening elements for fastening a transverse strut, which fastening elements are preferably connected nonpositively, seamlessly, or positively to the sleeves by electromagnetic pulse forming. This allows easy manufacture of the deformation element according to the invention. In particular, the assembly or production steps can be combined with pulse forming and executed in one operation.

A motor vehicle fender bracket system is also provided that comprises at least one fastening element for fastening the motor vehicle fender bracket to an engine bearer module and a deformation element according to the previous described invention.

A method is also provided for producing a deformation element, in particular a deformation element explained initially comprising: having ready a first sleeve, a second sleeve, and a spring-elastic element; introducing at least one first embossing into the first sleeve; inserting the spring-elastic element into the first sleeve, in particular with prestressing; pushing the second sleeve onto the first sleeve, as well as introducing an embossing into the second sleeve to produce a tight fit with the at least one embossing of the first sleeve. Such a deformation element can be produced particularly simply and cost-effectively since it has a small number of components and the manufacturing steps can be executed in an uncomplicated manner.

According to a further embodiment of the method, it can be provided that the at least one embossing is produced by electromagnetic pulse forming and/or by roll forming. In a further embodiment of the method, it can be provided that fastening elements are attached nonpositively, seamlessly, or positively to the first sleeve and/or the second sleeve by electromagnetic pulse forming. This makes it possible to use an electromagnetic pulse forming station for carrying out all the pulse forming steps. Further forming steps or forming stations can be saved in this way.

Further aims, features, and advantageous possible applications are obtained from the following description of an exemplary embodiment with reference to the drawings. All the features described and/or depicted pictorially form the subject matter, independently of the claims and their back-references.

BRIEF DESCRIPTION OF THE DRAWINGS

The present invention will hereinafter be described in conjunction with the following drawing figures, wherein like numerals denote like elements, and:

FIG. 4b shows an enlarged view of a section from FIG. 4a;

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
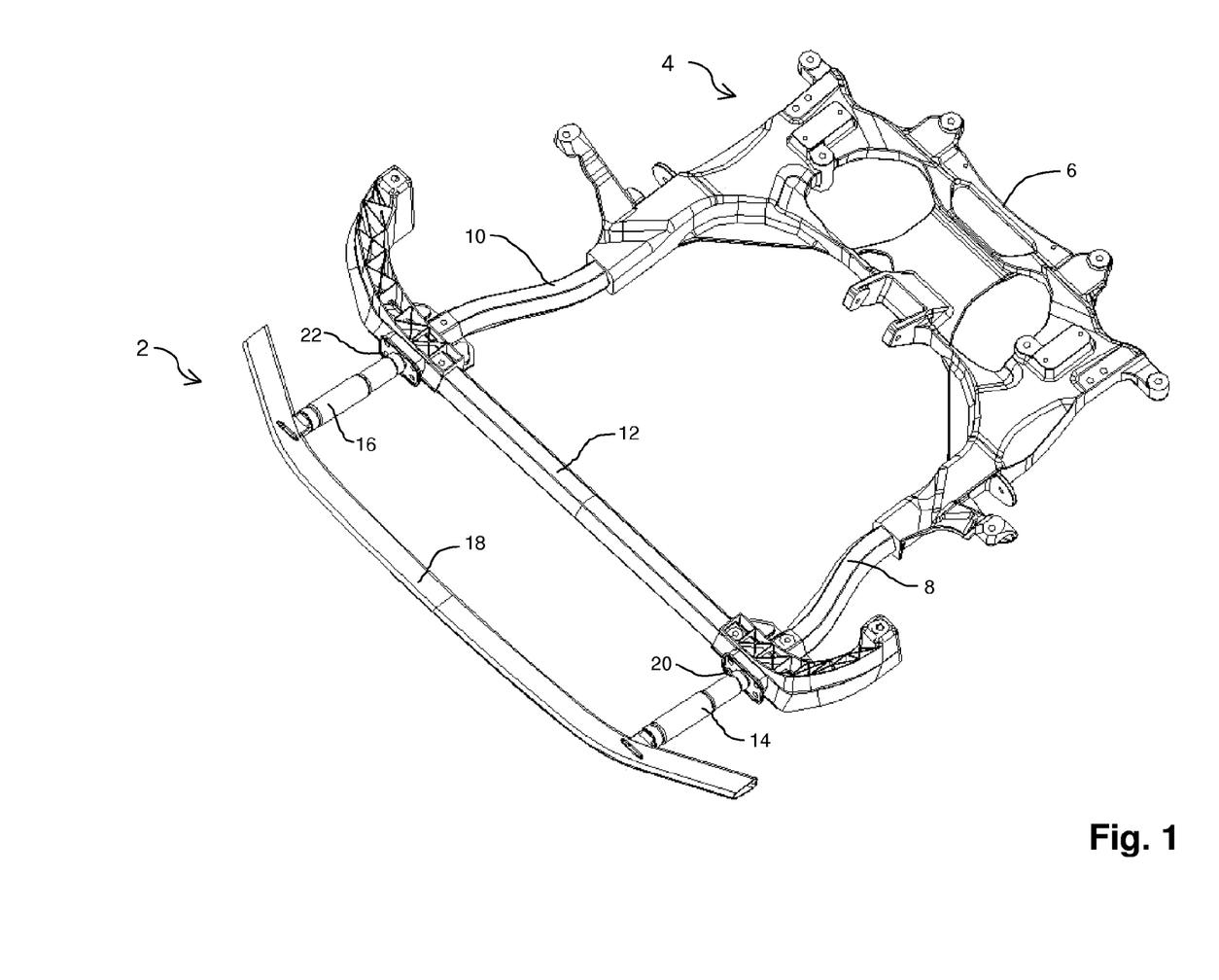
FIG. 1 shows a perspective view of a motor vehicle fender bracket on an engine bearer module according to an embodiment.

FIG. 1 shows a schematic perspective view of a motor vehicle fender bracket 2 mounted on an engine bearer module 4 of a motor vehicle. The engine bearer module 4 is preferably a unit which comprises an engine bearer 6 with lower longitudinal members 8, disposed thereon or integrated. The engine bearer module 4 serves to accommodate engine and transmission components of the motor vehicle and for the simplified installation of these components into the motor vehicle. The engine bearer module 4 is an additional structural component which serves to relieve the stress of the central structural load path on the body side.

The motor vehicle fender bracket 2 has two deformation elements 14, 16 that at one end are connected to the lower longitudinal members 8, 10 of the engine bearer module 4 and which at the other end are connected to the lower transverse member 18, to which the front fender of the motor vehicle can be fastened directly or indirectly. Fastening elements 20, 22 are provided for fastening the deformation elements 14, 16 on the lower longitudinal member 8, 10.

The embodiments are is explained in connection with a front motor vehicle fender bracket system, but can naturally can also be used for all other fender brackets attached to the motor vehicle. When used as a rear motor vehicle fender bracket, the terms "front" and "rear" should be exchanged.

Figure 2:
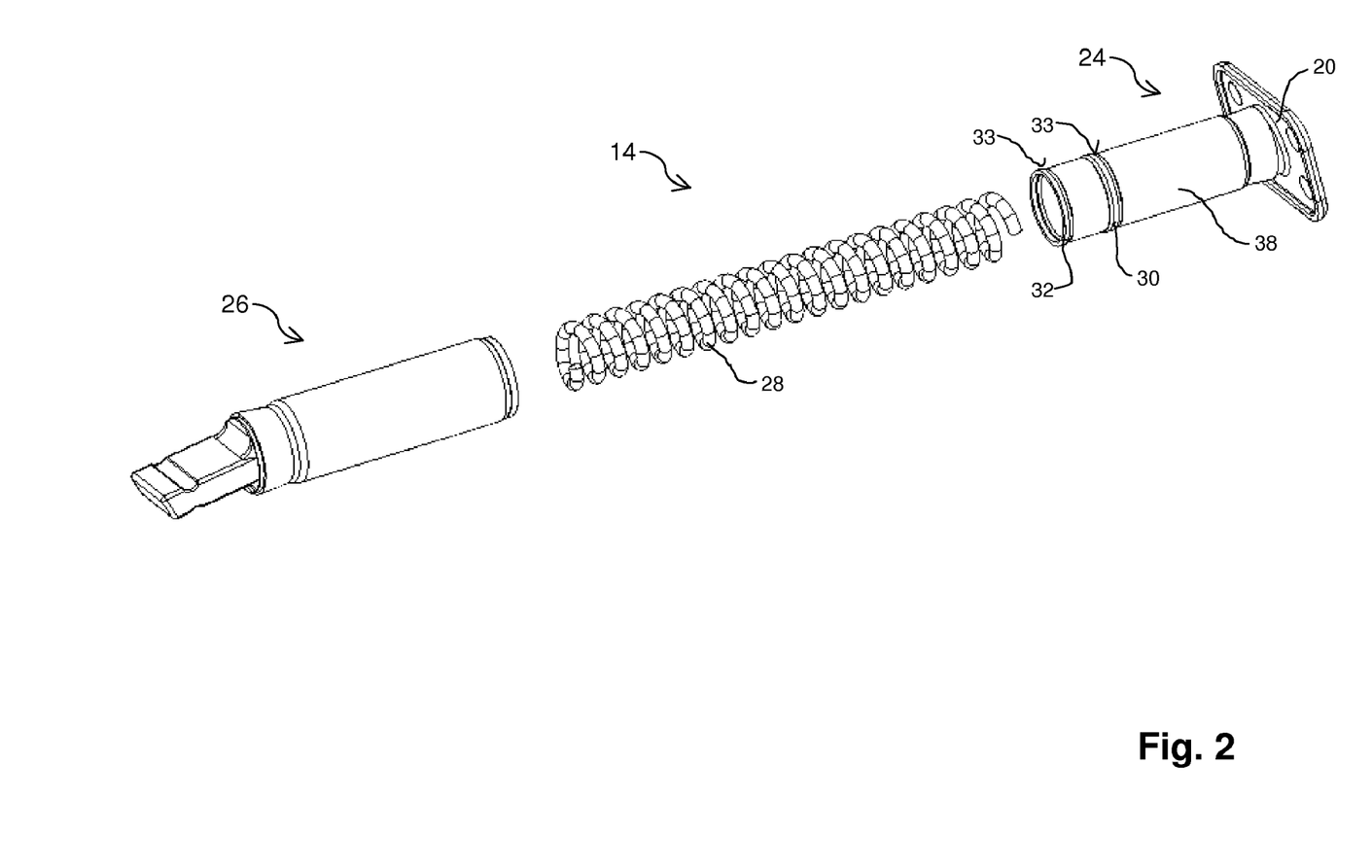
FIG. 2 shows an exploded view of a deformation element according to the embodiment.

FIG. 2 shows a schematic perspective exploded view of the deformation element 14. The deformation element 14 has three main components. A rear deformation element sleeve 24 is provided in the rear region, and a front deformation element sleeve 26 is provided in the front region. Provided between the rear deformation element sleeve 24 and the front deformation element sleeve 26 is a compression spring 28, which in the exemplary embodiment shown is designed as a helical spring, but can easily be present in other known forms of compression spring.

Figure 3:
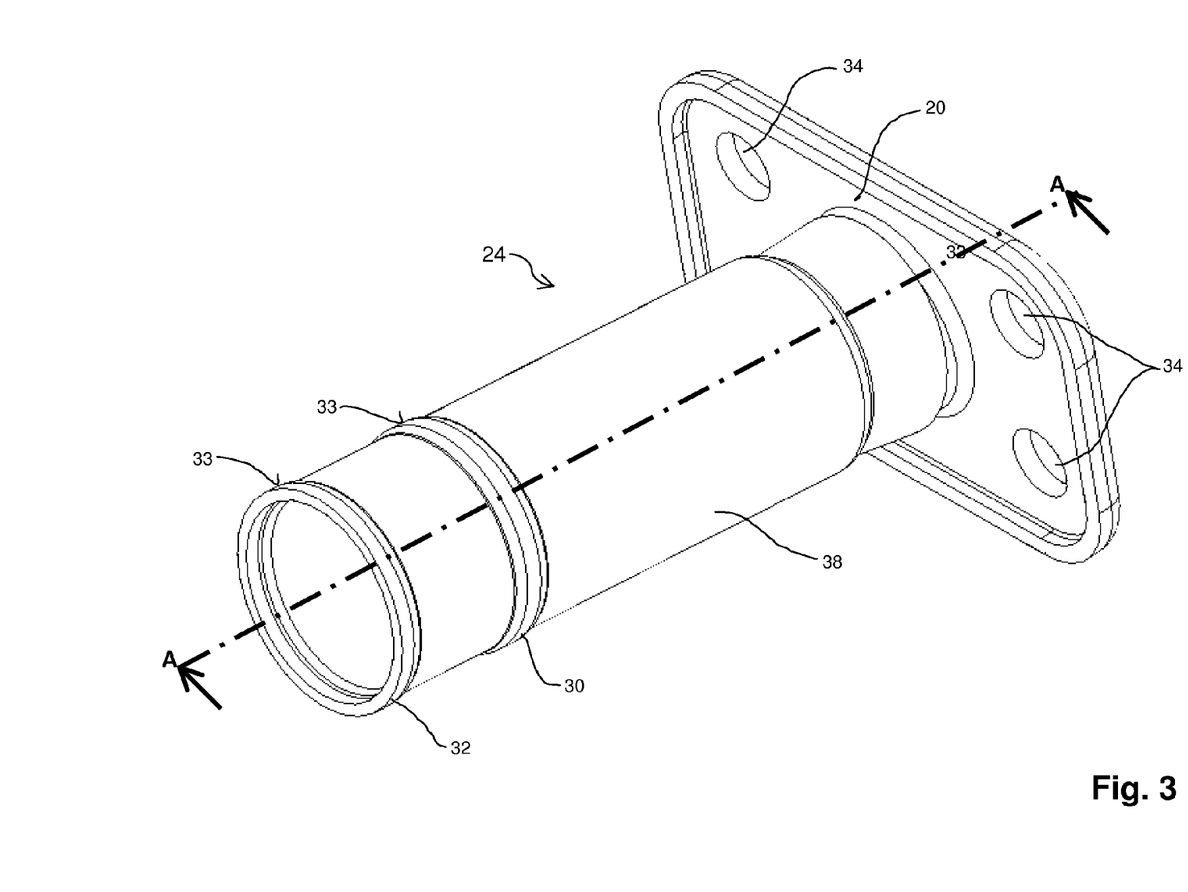
FIG. 3 shows a perspective view of the rear section of the deformation element according to the embodiment from FIG. 2.

The rear deformation element sleeve 24 has two peripheral embossings 30, 32, whose function will be explained more precisely hereinafter. Furthermore, the rear deformation element sleeve 24 has the fastening element 20, which serves to connect the deformation element 14 to the lower longitudinal member 8 of the motor vehicle. FIG. 3 shows the rear deformation element sleeve 24 in an enlarged, perspective view. The rear deformation element sleeve 24 is composed of a rear tubular element 38, in which the embossings 30, 32 are introduced by means of electromagnetic pulse forming, and the fastening element 20. The rear tubular element 38 is connected nonpositively to the rear fastening element 20, which has fastening holes 34 for fastening to the lower longitudinal member 8. The two embossings 30, 32 are disposed on the rear tubular element 38 spaced apart from one another axially. The embossings 30, 32 form sliding surfaces 33, on which the front deformation element sleeve 26 not shown in FIG. 3 can slide.

Figure 4A:
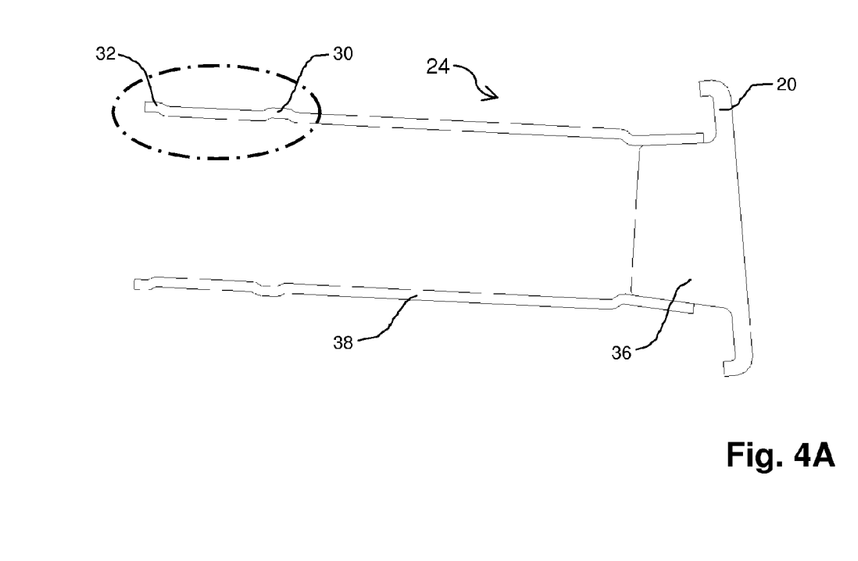
FIG. 4a shows a sectional view along the line of intersection A-A through the rear section of the deformation element according to FIG. 3.
Figure 4B:
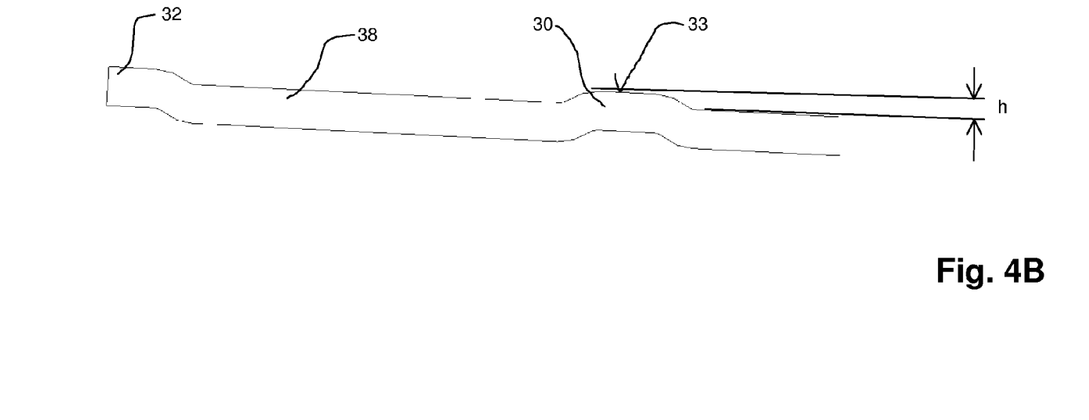

FIG. 4a shows a cross-section along the line of intersection A-A according to FIG. 3. The rear fastening element 20 has a flange 36 that projects into the rear tubular element 38 and is connected positively or nonpositively to the rear tubular element 38 in the overlap region formed by electromagnetic pulse forming. Alternatively, a seamless connection could be made by means of ultrasound welding or laser welding. As can be seen in the enlarged view of the section according to FIG. 4b, the two peripheral embossings 30, 32 have a height h of about 1 mm.

Figure 5:
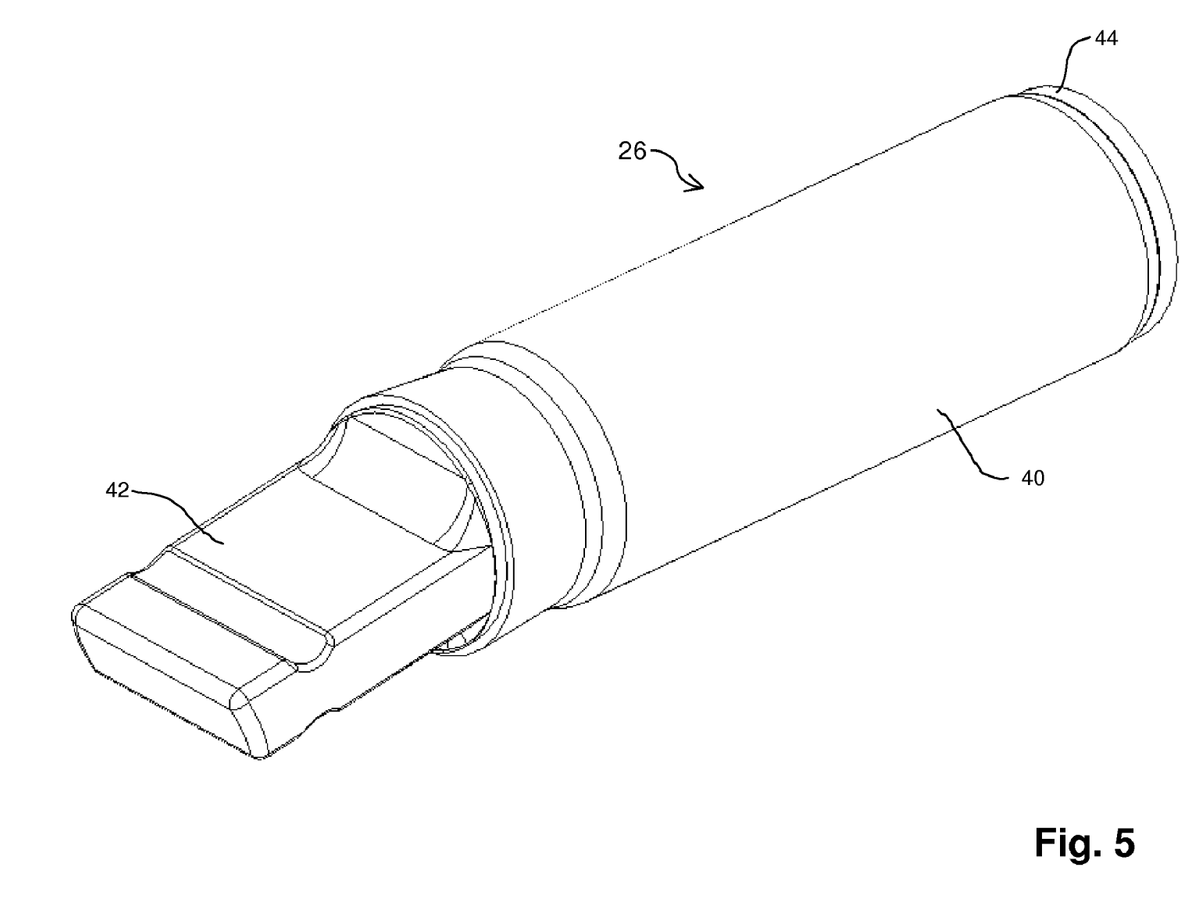
FIG. 5 shows a schematic perspective view of the front section of the deformation element according to FIG. 2.

FIG. 5 shows the front deformation element sleeve 26 in a schematic perspective view. The front deformation element sleeve 26 has a front tubular element 40 and a fastening element connected nonpositively to the front tubular element 40 for connection of the deformation element according to the invention to the transverse member 18. A peripheral embossing 44 is provided at the rear end of the front tubular element 40.

Figure 6:
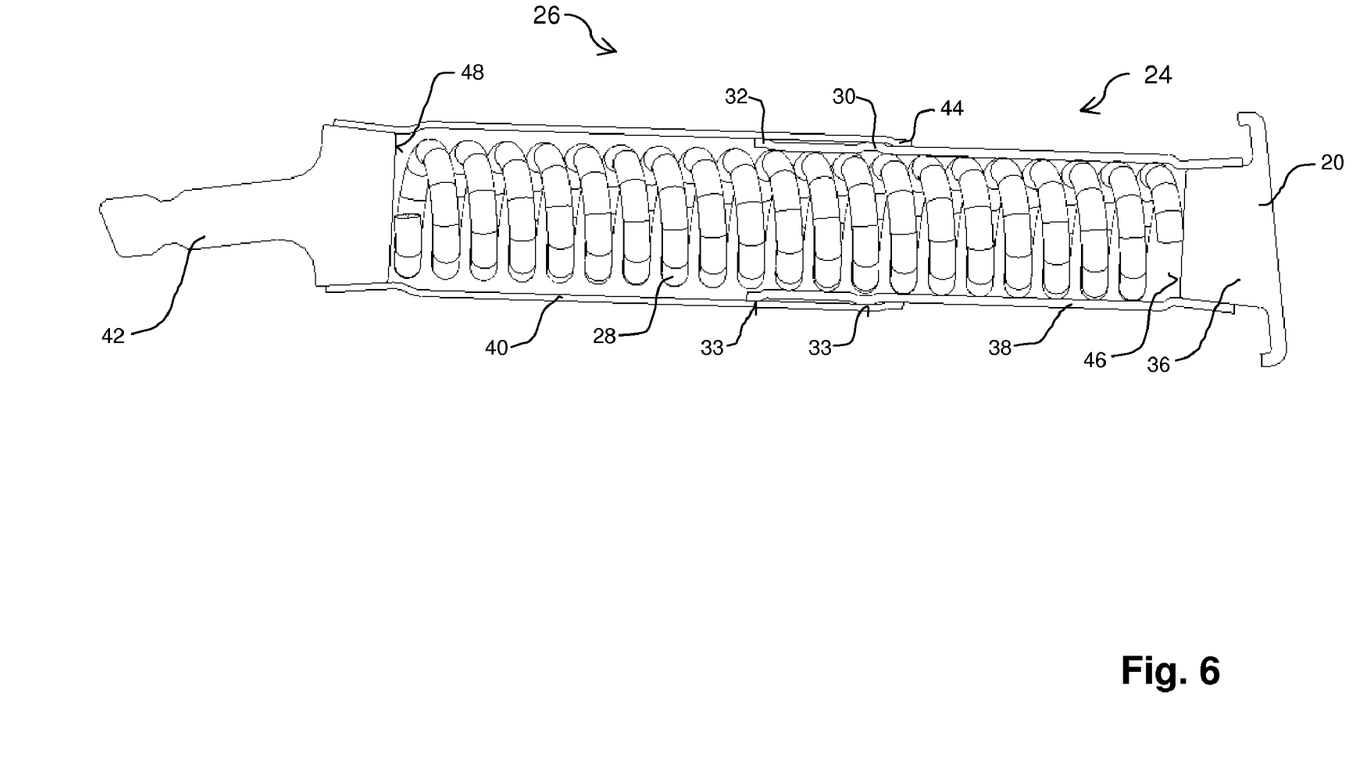
FIG. 6 shows a sectional view through a mounted deformation element.

FIG. 6 shows a cross-section through a mounted deformation element 14. The front deformation element sleeve 26 is in this case pushed onto the rear deformation element sleeve 24. The compression spring 28 is disposed between the deformation element sleeves 24, 26. The rear flange 36 forms a rear stop surface 46 for the compression spring 28, the front fastening element 42 forms a front stop surface 48. The length of the compression spring 28 in the relaxed state is at least somewhat longer than the maximum distance of the stop surfaces 46, 48 so that the compression spring 28 is easily prestressed in the deformation element 14.

The length of the deformation element 14 is determined by a translation stop that is formed from the rear embossing 30 of the rear tubular element 38 and the end embossing 44 of the front tubular element 40. These form a tight fit in the mounted state, which prevent the deformation element 14 according to the invention from expanding further in the axial direction.

Figure 7A:
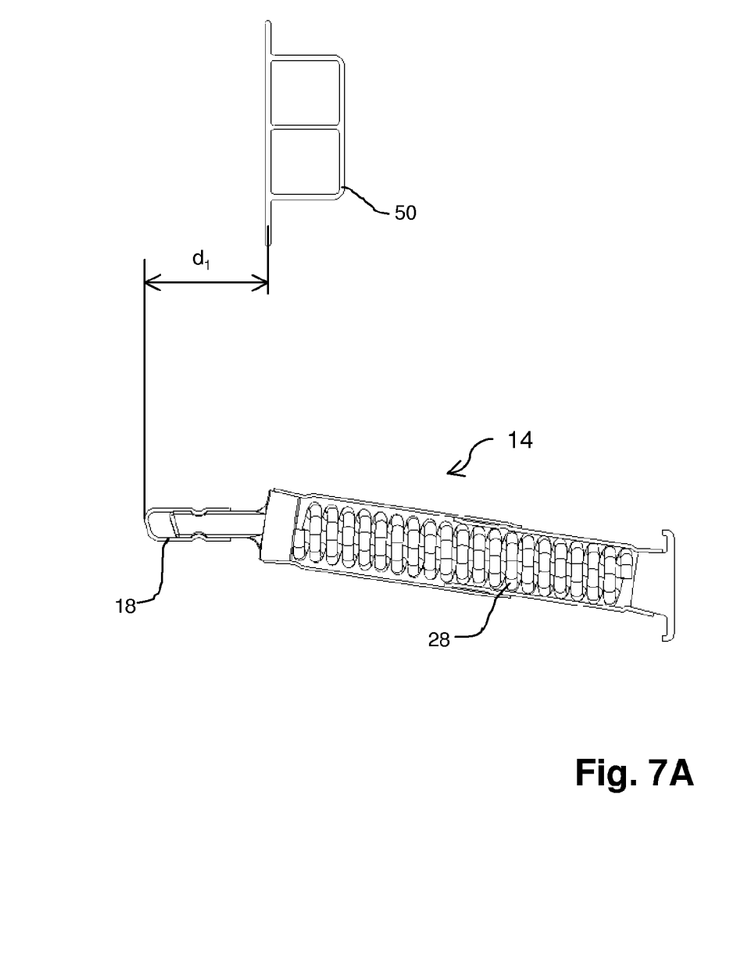
FIG. 7a shows a sectional view through a deformation element mounted in a motor vehicle in relation to a further fender bracket.

FIG. 7a shows the deformation element 14 in the expanded state in positional relationship to a fender bracket 50. The fender bracket 50 is preferably the upper fender bracket attached in front of the longitudinal frame of the motor vehicle body. In practice, the apparent installation position of deformation element 14 and fender bracket 50 with respect to one another can appear differently, the position shown in FIG. 7a relates to an imaginary, exactly perpendicularly running mounting plane for the front fender (not shown). The diagram according to FIG. 7a therefore shows the functional mode of action of the deformation element 14.

In the relaxed state of the deformation element 14, the deformation element 14 lies vertically in front of the mounting plane of the fender bracket 50. Both are spaced apart from one another at a vertical distance d1. This has the effect that a fender, which in modern motor vehicles is preferably made of plastic and is disposed in front of the fender bracket 50 and the lower transverse member 18 (e.g., bracket), and on which a force acts in the direction opposite to the direction of travel of the motor vehicle, can pivot about the upper fender bracket 50, whereby the deformation element 14 is shortened.

Figure 7B:
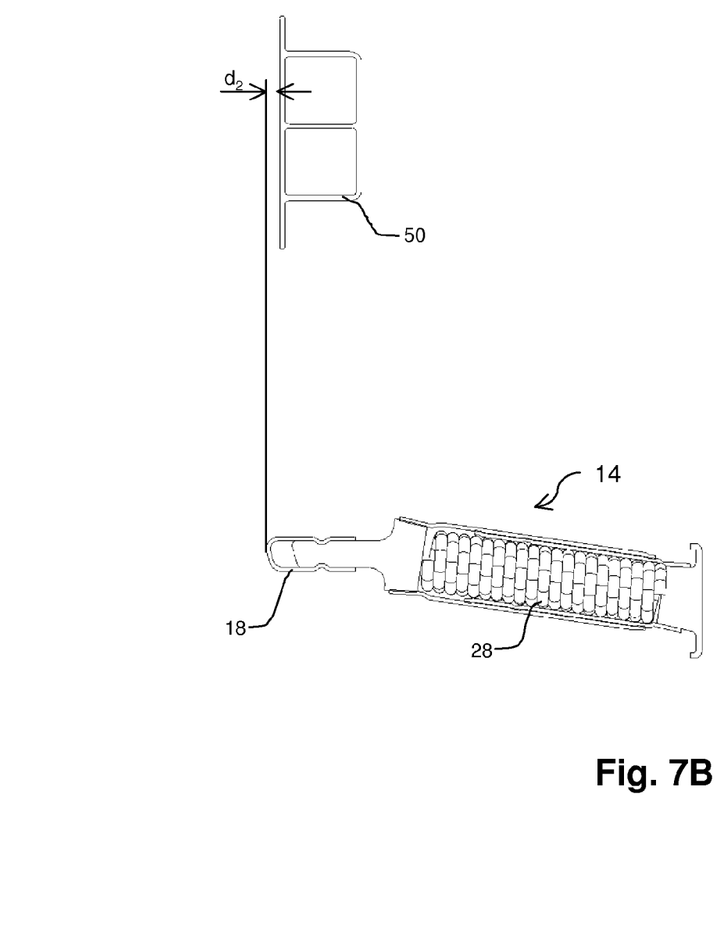
FIG. 7b shows the view from FIG. 7a with compressed deformation element.

Depending on the impulse introduced, the compression spring 28 is compressed so far until it completely becomes a block as shown in FIG. 7b. At this time, the distance between the mounting position of the fender bracket 50 and the lower transverse member is reduced to a very small but still positive vertical distance d2. Up until this time, it is possible for the deformation element 14 to relax again due to the force of the compression spring 28. No damage to the fender or the frame structure located there behind is to be expected. Only in the case of impulses which introduce a greater energy into the deformation element 14, are these energies introduced into the motor vehicle frame structure and must be reduced by this accompanied by permanent material deformation.

Furthermore, the arrangement of lower transverse member 18 and deformation element 14 relative to the fender bracket 50 has the result that in the event of a collision with a pedestrian, the lower part of the fender is initially compressed, which produces a counteracting force through the compression spring 28, which imparts an angular momentum to the pedestrian in such a manner that he is raised onto the front hood of the motor vehicle. The probability of the pedestrian being run over is considerably reduced in this way.

Figure 8A:
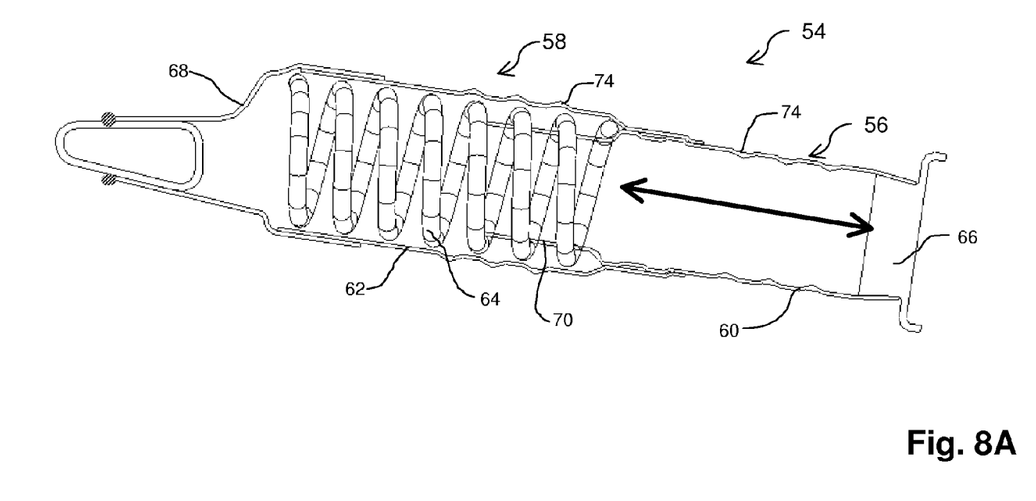
FIG. 8a shows a section through a deformation element according to a second embodiment.
Figure 8B:
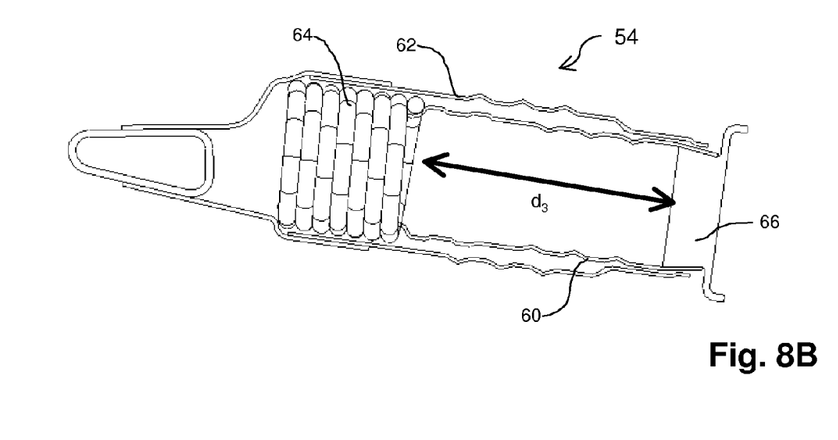
FIG. 8b shows a deformation element according to the second embodiment in the compressed state.

FIG. 8a shows a further embodiment of a deformation element 54. The deformation element 54 according to the second embodiment differs from the deformation elements 14, 16 according to the first embodiment primarily in that the deformation element 54 according to the second embodiment has an additional deformation path that is not elastic, but is configured as a desired deformation space. In the case of medium-sized introduced impulses, this is permanently deformed while absorbing energy before the longitudinal or transverse members of the engine bearer module 4 are acted upon. In the case of an impact at such low speeds, it is thus sufficient to replace the deformed deformation element 54.

In order to achieve such specific deformation, the tubular elements 60, 62 are provided with profilings 72, 74. By analogy with the first exemplary embodiment, a compression spring 64 is clamped between the rear deformation sleeve 56 and the front deformation sleeve 58. Unlike the first exemplary embodiment shown, the rear tubular element 60 forms a guide section 70 for the compression spring 64.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A deformation element for receiving external impulses introduced into the deformation element, comprising:
   at least two sleeves that are displaceable relative to one another;
   a spring-elastic pressure element supported on the at least two sleeves; and
   at least one embossing for a first sleeve of the at least two sleeves that form a sliding surface for a second sleeve of the at least two sleeves.

2. The deformation element according to claim 1, wherein the at least two sleeves are arranged to be at least partially overlapping.

3. The deformation element according to claim 2, wherein the first sleeve is provided on an inner sleeve.

4. The deformation element according to claim 3, wherein in a region of the at least one embossing, the inner sleeve comprises an extension that is less than or equal to an internal extension of the second sleeve.

5. The deformation element according to claim 1, further comprising a second embossing spaced apart axially from the at least one embossing.

6. The deformation element according to claim 1, wherein the at least one embossing has a height of approximately 0.5 mm to 3 mm.

7. The deformation element according to claim 6, wherein the height is approximately 1 mm to 2 mm.

8. The deformation element according to claim 3, wherein an external sleeve comprises an embossing that forms a translation stop with the at least one embossing of the inner sleeve.

9. The deformation element according to claim 1, wherein the at least one embossing is an electromagnetic pulse formed embossing.

10. The deformation element according to claim 1, wherein the at least two sleeves comprise tubular elements having a circular cross-section.

11. The deformation element according to claim 1, wherein the at least two sleeves comprise tubular elements having an oval cross-section.

12. The deformation element according to claim 1, wherein the at least two sleeves comprise tubular elements having a rectangular cross-section.

13. The deformation element according to claim 1, wherein the at least two sleeves comprise tubular elements having a square cross-section.

14. The deformation element according to claim 1, further comprising fastening elements adapted to fasten to longitudinal members of an engine bearer module and adapted to fasten a transverse strut, the fastening elements connected nonpositively to the at least two sleeves by electromagnetic pulse forming.

15. A motor vehicle fender bracket, comprising:
   an engine bearer module;
   at least one fastening element adapted to fastening the motor vehicle fender bracket to the engine bearer module; and
   a deformation element adapted for fastening with the at least one fastening element to the motor vehicle fender bracket, the deformation element comprising:
      at least two sleeves that are displaceable relative to one another;
      a spring-elastic pressure element supported on the at least two sleeves; and
      at least one embossing for a first sleeve of the at least two sleeves that form a sliding surface for a second sleeve of the at least two sleeves.

16. The motor vehicle fender bracket according to claim 15, wherein the at least two sleeves are arranged to be at least partially overlapping.

17. The motor vehicle fender bracket according to claim 16, wherein the first sleeve is provided on an inner sleeve.

18. A method for producing a deformation element, comprising the steps of:
   providing a first sleeve;
   providing a second sleeve;
   providing a spring-elastic element;
   introducing at least one first embossing into the first sleeve;
   inserting the spring-elastic element into the first sleeve;
   pushing the second sleeve onto the first sleeve; and
   introducing an embossing into the second sleeve to produce a tight fit with the at least one embossing of the first sleeve.

19. The method according to claim 18, further comprising producing the at least one embossing by electromagnetic pulse forming.

20. The method according to claim 18, further comprising producing the at least one embossing by roll forming.

21. The method according to claim 18 attaching fastening elements to the first sleeve by electromagnetic pulse forming.

* * * * *